United States Patent [19]

Bosley, Jr. et al.

[11] 4,238,517

[45] Dec. 9, 1980

[54] FROZEN FRENCH FRIED POTATO PRODUCT AND METHOD OF PREPARATION

[75] Inventors: Roy E. Bosley, Jr.; Michael L. Hamann; Richard K. Pinegar, all of Caldwell, Id.; Harold G. Gobble, Pughtown, Pa.

[73] Assignee: J. R. Simplot Co., Boise, Id.

[21] Appl. No.: 967,960

[22] Filed: Dec. 11, 1978 (Under 37 CFR 1.47)

[51] Int. Cl.³ .............................................. A23L 1/216

[52] U.S. Cl. .................................... 426/250; 426/272; 426/327; 426/550; 426/637; 426/661; 426/441; 426/808

[58] Field of Search ................. 426/96, 100, 102, 262, 426/267, 272, 321, 327, 550, 637, 650, 653, 661, 438, 439, 441, 496, 497, 512, 524, 808, 250

[56] References Cited

U.S. PATENT DOCUMENTS

| | | | |
|---|---|---|---|
| 3,027,258 | 3/1962 | Markakis et al. | 426/441 X |
| 3,109,739 | 11/1963 | Hilton | 426/441 X |
| 3,205,073 | 9/1965 | Blanch et al. | 426/653 |
| 3,468,673 | 9/1969 | Keller | 426/441 X |
| 3,911,142 | 10/1975 | Huelskamp et al. | 426/808 X |
| 3,968,265 | 7/1976 | Shatila et al. | 426/637 X |
| 3,997,684 | 12/1976 | Willard | 426/637 X |
| 4,007,292 | 2/1977 | Shatila et al. | 426/637 |
| 4,082,855 | 4/1978 | Citti et al. | 426/637 X |
| 4,109,012 | 8/1978 | Bates et al. | 426/637 X |
| 4,135,004 | 1/1979 | Finkel | 426/637 X |

FOREIGN PATENT DOCUMENTS

| | | | |
|---|---|---|---|
| 1386785 | 3/1975 | United Kingdom | 426/637 |

OTHER PUBLICATIONS

*Potato Processing,* Talburt et al., 1967, pp. 400–401.

*Primary Examiner*—Arthur L. Corbin

*Attorney, Agent, or Firm*—Fulwider, Patton, Rieber, Lee & Utecht

[57] ABSTRACT

A frozen French fried potato product for heating in a toaster or oven, is provided. The product is made from a cohesive dough which is prepared by admixing cooked potatoes with additives comprising water, a binding agent, cellulose, and dehydrated potato flakes or granules. The dough is extruded into said product which is fried in cooking oil and frozen.

5 Claims, No Drawings

FROZEN FRENCH FRIED POTATO PRODUCT AND METHOD OF PREPARATION

BACKGROUND OF THE INVENTION

1. Field of the Invention

The invention relates to a frozen fried food product, and more particularly, to a frozen french fried potato product.

2. Description of the Prior Art

Commercially fabricated frozen food products, such as french fried potatoes and the like, which are designed to be fried or cooked prior to consumption, are generally prepared by fabricating the product into its desired shape and then freezing the product. The product may be frozen in its raw or uncooked condition, or it may be fried or partially fried before freezing. In either event, the frozen product must be fried, refried or heated prior to consumption.

The need to fry or refry the product is relatively inconvenient, especially in the home, inasmuch as it requires the use of deep fat frying apparatus, hot cooking oil, and a substantial clean-up operation.

To overcome this disadvantage, the art has developed frozen french fried potato products which may be heated in a toaster. Such products tend to be unsatisfactory because they do not fully duplicate the flavor, taste and texture of a freshly fried french fried potato, and because they tend to blister during frying due to the expansion of trapped steam which forces its way out of the surface of said product.

Accordingly, an object of the invention is to provide a frozen fried food product which need not be fried prior to consumption, but which may be prepared for consumption merely by heating in a conventional toaster or oven, and which substantially duplicates the taste, flavor and texture of hot fried product.

Another object of the present invention is to provide a frozen french fried potato product comprised of individual french fried potatoes pieces which will not blister during frying, which will retain their integrity during heating and subsequent handling, and which can be easily separated from said product by hand without crumbling or falling apart.

Other objects and advantages of the invention will become apparent as the specification proceeds.

SUMMARY OF THE INVENTION

The frozen fried food product of the present invention is generally prepared by forming a dough comprised of a farinaceous material, such as cooked, mashed potatoes, and selective amounts of certain additives which are admixed with the farinaceous material to form the dough. The additives generally comprise water, binding agents, cellulose and dehydrated potato flakes or granules. The dough is then shaped into the desired configuration of the food product which is fried in cooking oil to control the water content of said product to a predetermined level, and to absorb a predetermined amount of the cooking oil and to obtain a predetermined color. Thereafter, the fried product is frozen and packaged.

In a more preferred aspect of the present invention, the product is fabricated into a unitary structure having segments of individual french fried potatoes connected to each other. The overall dimensions and weight of the product are selected so that the product may be conveniently inserted and removed from a pop-up type electric toaster. The product retains its integrity during heating and subsequent handling, and the individual french fries can be pulled off said product by hand without crumbling or falling apart. The french fries from the heated product have substantially the same flavor, taste, and texture as a hot fried product.

DESCRIPTION OF THE PREFERRED EMBODIMENT

The preferred embodiment of the present invention comprises a frozen french fried potato product having a plurality of individual french fried potatoes connected to each other. The product should be about four inches in length and about 0.4 inches in thickness so that the product may be conveniently inserted and removed from a pop-up type electric toaster. The product preferably weighs about 55 grams inasmuch as pop-up household toasters generally cannot lift more than about 60 grams of weight.

The composition of said frozen french fried potato product in terms of its preferred composition and the latitude of each ingredient in the composition, is as follows:

| Ingredient | Approximate Preferred number of parts | Approximate Permissible latitude of each ingredient-wt. % of the dough prior to frying unless otherwise noted |
|---|---|---|
| Cooked mashed potato | 55.79 | 45 to 70 |
| Water | 22.69 | 15 to 30 |
| Potato flakes or granules | 16.37 | 10 to 30 |
| Dairy whey and calcium casinate, at a ratio of 4 parts to 1 part, respectively | 1.80 | 1 to 2.5 |
| High amylose corn starch 1.71 | 0.5 to 3 | |
| Salt | 0.49 | 0 to 0.6 |
| Guar gum | 0.42 | 0.2 to 0.6 |
| Cellulose consisting of 89% microcrystalline cellulose and 11% sodium carboxy methyl cellulose | 0.40 | 0.2 to 1.0 |
| Disodium pyro phosphate ($Na_2H_2P_2O_7$) | 0.1 | 0.05 to 0.2 |
| Sodium aluminum phosphate | 0.10 | 0.0 to 0.3 |
| Sodium bicarbonate of soda, USP grade No. 1 | 0.08 | 0 to 0.4 |
| Flavor potato | 0.025 | 0 to 0.05 |
| Flavor avod | 0.025 | 0 to 0.05 |
| Cooking oil absorbed during frying | 8.0 | 5 to 15 weight percent of frozen fried product |

To prepare the aforesaid composition, potatoes are cooked under controlled conditions to minimize the rupture of potato cells and to inhibit the release of free starch. This controlled cooking process comprises cooking pieces of potatoes in 160° F. to 175° F. water for a period of from about 4 minutes to about 15 minutes. Thereafter, the potatoes are drained from the water, and rapidly cooled to a temperature from about 60° F. to about 90° F. for a period of about 2 to about 15 minutes. The cooked potato is then steam cooked for about 15 to about 30 minutes under atmospheric conditions, mashed, and maintained at a temperature of about 150° F.

The solids content of the cooked potato should be in the range of about 19% to about 26% by weight of solids. Following preparation of the cooked potatoes, a dough is formed by admixing the cooked potatoes with the balance of the ingredients set forth in the above formulation.

In preparing the ingredients for admixture into the cooked potato, the cellulose material and guar gum, which function as binders, are preferably dry blended and then mixed with water, stirred, and allowed to age for a period of about two minutes to not more than about 4 hours. This aging allows the cellulose material and guar gum to hydrate and achieve their useful viscosity level. Increased levels of guar gum and cellulose material would be required if they were not hydrated prior to use. The binders function to bind the potato mash together and to inhibit fat absorption during subsequent frying. The mixture of cellulose material and guar gum is preferred because it has been found to give the best balance between a satisfactory binding action and low fat absorption, and also allows moisture to escape during frying without blistering the surface of the product.

The cellulosic material in the composition provides porosity to the skin of the food product so that steam may escape when the product is toasted or cooked. Cellulose also affects oil absorption and binding characteristics of the product. At cellulose levels above 1.0% by weight of the dough, excessive oil absorption is observed after frying. At cellulose levels below 0.2% of the dough, the internal texture of the french fry tends to be pasty or gummy and excessive oil absorption is observed.

Dehydrated potato flakes or dehydrated potato granules serve as a binder and also provide bulk, absorb excess water, and provide flavor to the final product. Dehydrated potato flakes are preferred because they produce a better texture and a better over all acceptance of the final product.

The preferred range of potato flakes is from about 10% to about 30% by weight of the dough. If more than 30% of potato flakes is used, the final product will tend to "feather" if the dough is extruded in forming the shape of the final product. If less than 10% of flakes is used, the texture of the final product is not desirable.

Dairy whey and calcium caseinate are used to impart color and flavor to the final product.

The starch functions as a binder and provides a crisp exterior, and a mealy, full texture to the interior of the product after it is toasted or cooked. The preferred range of the binder is from about 0.7% to about 3.6% by weight of the dough.

Disodium pyrophosphate inhibits the final product from discoloring and serves as a leavening agent.

Sodium aluminum phosphate is a leavening agent that is heat activated by frying in cooking oil.

Sodium bicarbonate of soda functions as a leavening agent.

It is preferred that the ratio of sodium aluminum phosphate to sodium bicarbonate of soda in said composition is about one to one, and that the ratio of disodium pyrophosphate to sodium bicarbonate of soda is about one to 0.7, respectively.

The additives are admixed with the cooked potatoes, which are maintained at a temperature of at least 150° F., and the resultant dough is reduced to a temperature of from about 110° F. to about 75° F. The dough has a total water content of about 65% to about 80% by weight.

If the dough is shaped into the final product by means of an extrusion apparatus, the temperature of the dough should not be above about 110° F. or the dough may feather during extrusion. Extrusion pressures from about 5 to about 50 pounds per square inch guage (psig) have been been found to be satisfactory. At pressures over 50 psig, the product may become dense, tough and undesirable.

After the product is formed into the desired configuration, the product is fried in hot frying oil at a temperature of from 320° F. to about 390° F. for about 30 to about 120 seconds. The temperature of the frying oil is sufficiently high to fry the dough into the final product, but not so high as to burn the oil. This sears a skin on the product and causes the moisture content of the final product to be reduced to about 40% to about 60% by weight, and causes the absorption of about 5% to about 15% of the frying oil.

Frying to achieve the aforesaid water and oil content is an important factor in controlling the texture taste and color of the final product. If the moisture content is over 60%, the french fry will appear to be soggy and undesirable after heating in a toaster. If the oil content is below 5%, the product will not taste like a french fry. If the oil content is over 15%, the oil may drip into the toaster during heating and may create a risk of fire.

The frying oil may be any conventional oil used for frying foods. Examples of such oils are cottonseed oil, coconut oil, soybean oil, or blends of animal and vegetable oils.

After frying, the product is then frozen. When the product is french fried potatoes which are connected together, the product may be scored by a scoring means so that the individual french fries may be more readily separated from each other.

While the foregoing embodiment is at the present time considered to be preferred, it must be understood that the present invention is not limited thereto, but contemplates the use of other ingredients which are equivalent to the preferred ingredients and which may be developed by routine testing by one skilled in the art having the benefit of the present disclosure.

We claim:

1. A method for preparing a frozen French fried potato product for heating in a toaster or oven, comprising:

preparing about 56 parts of cooked potato having about 19 to 26 weight percent of solids, said potato being cooked in about 160° F. to about 175° F. water for about 4 to 15 minutes, drained from said water, cooled to about 60° F. to about 90° F. for about 2 to about 15 minutes and steam cooked for about 15 to 30 minutes under atmospheric pressure;

forming a dough by admixing the following additives into said cooked potato:

about 23 parts of water, about 16 parts of dehydrated potato flakes or potato granules, about 1.7 parts of starch, about 1.8 parts of mixture of dairy whey and calcium caseinate, about 0.42 parts of guar gum, about 0.40 parts of cellulose having a substantial amount of microcrystalline cellulose, about 0.1 parts of disodium pyrophosphate,
about 0.1 parts of sodium aluminum phosphate,
about 0.08 parts of sodium bicarbonate;
extruding said dough into said product;
frying said product in cooking oil at a temperature of about 320° F. to about 390° F. for about 30 to about 120 seconds to reduce the water content of said product to about 40% to about 60% by weight and to absorb about 5% to about 15% by weight of cooking oil; and
freezing said fried product.

2. A frozen French fried potato product, fried in cooking oil, for heating in a toaster or oven, said product made from a dough and comprising as weight percent of said dough:
about 45% to about 70% of a cooked mashed potatoes,
about 15% to about 30% of added water,
about 0.7% to about 3.6% of a binder,
about 0.2% to about 1% of cellulose having a substantial amount of microcrystalline cellulose,
about 10% to about 30% of potato flakes or potato granules,
disodium pyrophosphate in an amount equal to about 0.05% to about 0.2% by weight of said dough, sodium aluminum phosphate in an amount equal to 0.3% by weight of said dough;
sodium bicarbonate of soda in an amount equal to 0 to about 0.4% by weight of said dough,
said product having a water content of about 40% to about 60% by weight and a cooking oil content of about 5% to about 15% by weight after frying in said oil.

3. A frozen food product set forth in claim 2, having effective amounts of a coloring agent and a potato flavoring agent.

4. A frozen French fried potato product set forth in claim 2, wherein said product comprises a plurality of individual French fried potatoes connected to each other.

5. A frozen French fried potato product, fried in cooking oil, for heating in a toaster or oven, said product made from dough comprising:
about 56 parts of cooked potato having 19% to about about 26% by weight of solids, said potato being cooked in about 160° F. to about 175° F. water for about 4 to 15 minutes, drained from said water, cooked to about 60° F. to about 90° F. for about 2 to 15 minutes, and steamed cooked for about 15 to about 30 minutes under atmospheric pressure;
about 16 parts of dehydrated potato flakes or potato granules,
about 23 parts of water,
about 1.7 parts of starch,
about 1.8 parts of a mixture of dairy whey and calcium caseinate,
about 0.42 parts of guar gum,
about 0.40 parts of cellulose having a substantial amount of microcrystalline cellulose,
about 0.1 parts of disodium pyrophosphate,
about 0.08 parts of sodium aluminum phosphate,
about 0.1 parts of sodium bicarbonate,
said product having a water content of about 40% to 60% by weight and a cooking oil content of about 5% to about 15% by weight after frying in said oil.

* * * * *

UNITED STATES PATENT AND TRADEMARK OFFICE

CERTIFICATE OF CORRECTION

PATENT NO. : 4,238,517

DATED : DEC. 9, 1980

INVENTOR(S) : BOSLEY, JR. ET AL

It is certified that error appears in the above—identified patent and that said Letters Patent is hereby corrected as shown below:

Column 2, line 14, delete "inches" and insert therefor -- of an inch --;
line 36, delete "casinate" and insert therefor -- caseinate --.

Column 4, line 9, delete "guage" and insert therefor -- gauge --;
line 10, delete "been been" and insert therefor -- been --.

Column 5, line 16, delete "a".

Column 6, line 11, delete "19% to about" and insert therefor -- 19% to --.

Signed and Sealed this

*Twenty-eighth* Day of *April 1981*

[SEAL]

*Attest:*

RENE D. TEGTMEYER

*Attesting Officer* *Acting Commissioner of Patents and Trademarks*